United States Patent [19]

McGuire et al.

[11] 4,225,188
[45] Sep. 30, 1980

[54] APPARATUS FOR REMOVING AND COLLECTING MOISTURE FROM A MOISTURE-LADEN AIR FLOW

[75] Inventors: Robert C. McGuire, Dublin; Albertus G. Selder, Pickerington; Mark A. Hutchison, Columbus, all of Ohio

[73] Assignee: Dresser Industries, Inc., Dallas, Tex.

[21] Appl. No.: 950,549

[22] Filed: Oct. 12, 1978

[51] Int. Cl.³ ..................... E21C 35/22; B01D 47/02
[52] U.S. Cl. ............................... 299/64; 55/257 PV; 55/440
[58] Field of Search ............... 299/12, 64, 18; 55/233, 55/240, 257 PV, 260, 440

[56] References Cited

U.S. PATENT DOCUMENTS

| 808,897 | 1/1906 | Carrier .............................. 55/257 PV |
| 3,387,889 | 6/1968 | Ziemba et al. ........................... 299/12 |
| 3,792,568 | 2/1974 | Gundlach et al. ....................... 299/12 |
| 3,807,145 | 4/1974 | Engalitcheff et al. .......... 55/257 PV |
| 4,076,315 | 2/1978 | Gundlach et al. ................. 299/12 X |

Primary Examiner—Ernest R. Purser
Attorney, Agent, or Firm—Burns, Doane, Swecker & Mathis

[57] ABSTRACT

A mining machine of the type comprising a body, a driven cutter mounted on the body, and an air-cleaning system comprising ducting for conducting dust-laden air, a scrubber for applying liquid to the dust-laden air, and a demister for thereafter removing moisture from the air. The demister comprises a moisture separating station having a flow inlet, a flow outlet located rearwardly of the flow inlet, and moisture separating louvers forming air channels which receive air flow from the inlet and causing moisture in the air flow to separate-out and gravitate toward a lower collecting surface to be conducted rearwardly. A moisture accumulating section is located adjacent a rearward end of the collecting surface to receive the rearwardly conducted moisture. The accumulating section includes a floor, an end wall, a top wall, and a forwardly facing entrance for admitting the moisture. A vertical gap is provided between the top wall and the inflowing moisture to inhibit the upward travel of moisture droplets over the top wall where they would otherwise be re-entrained in the outgoing air flow.

8 Claims, 11 Drawing Figures

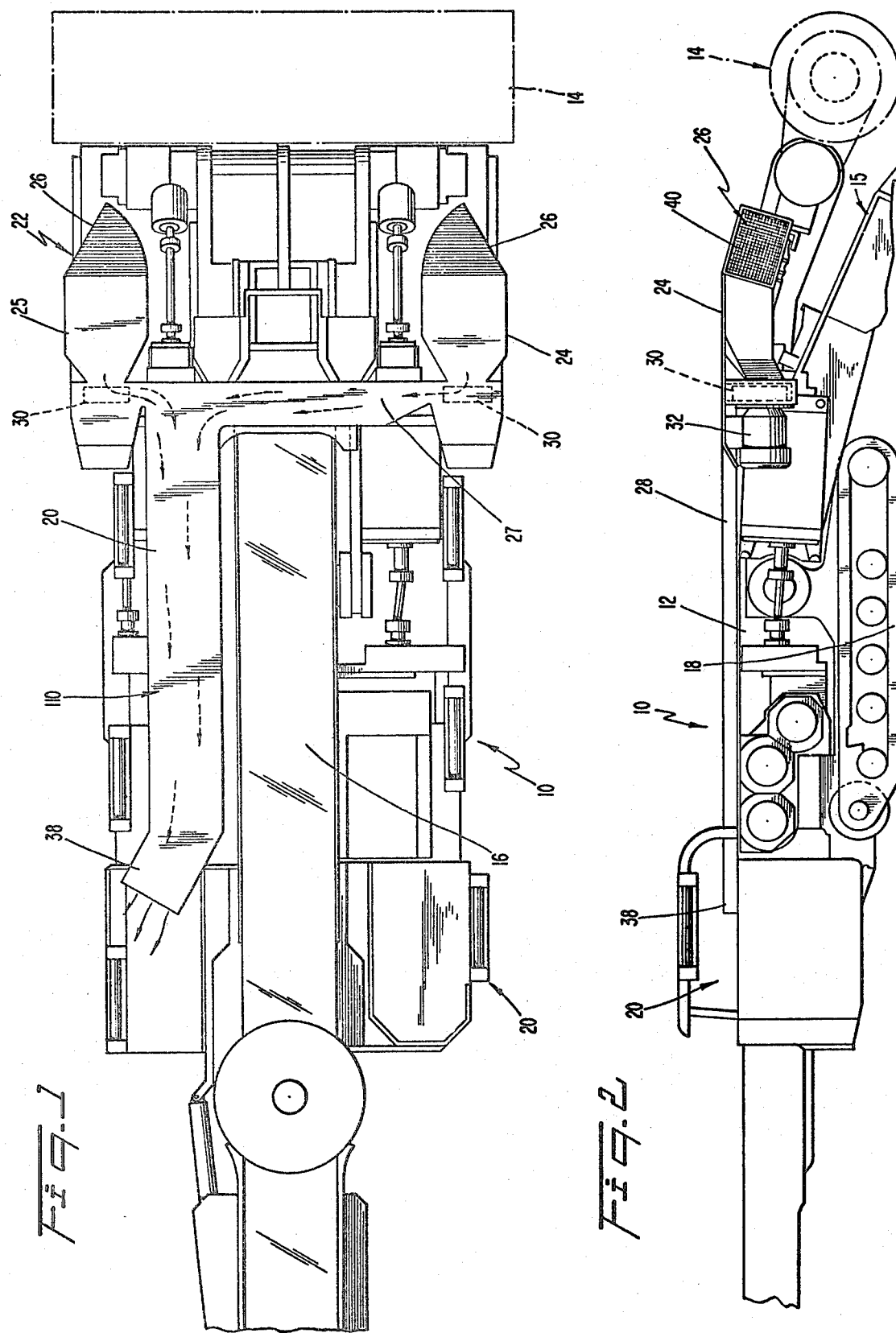

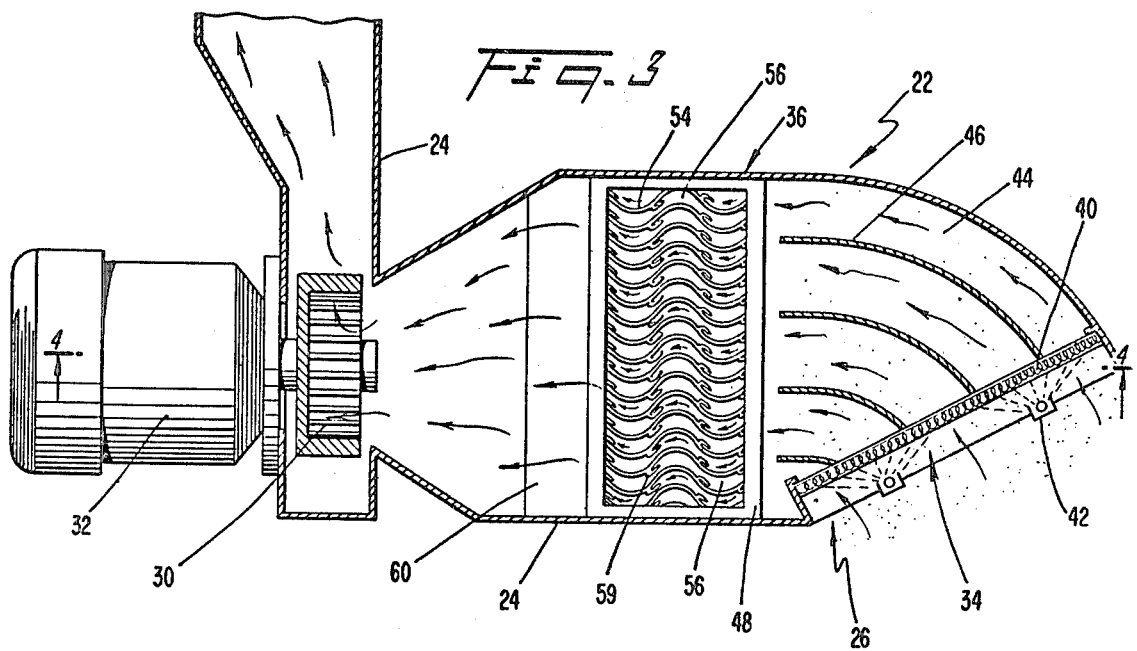
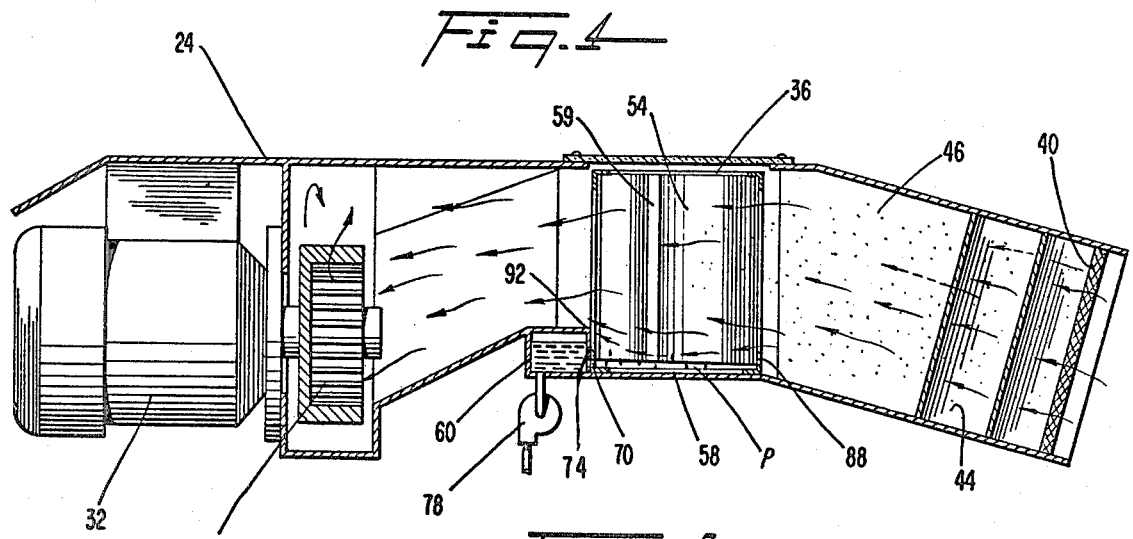
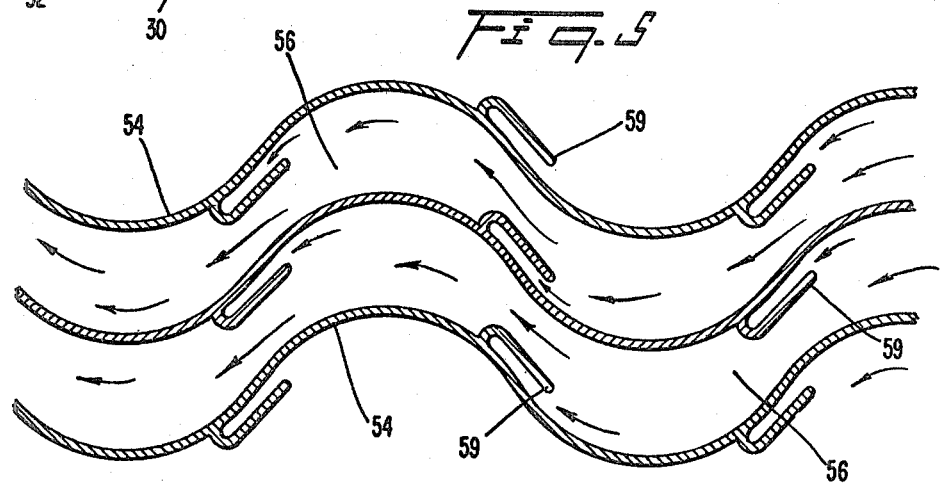

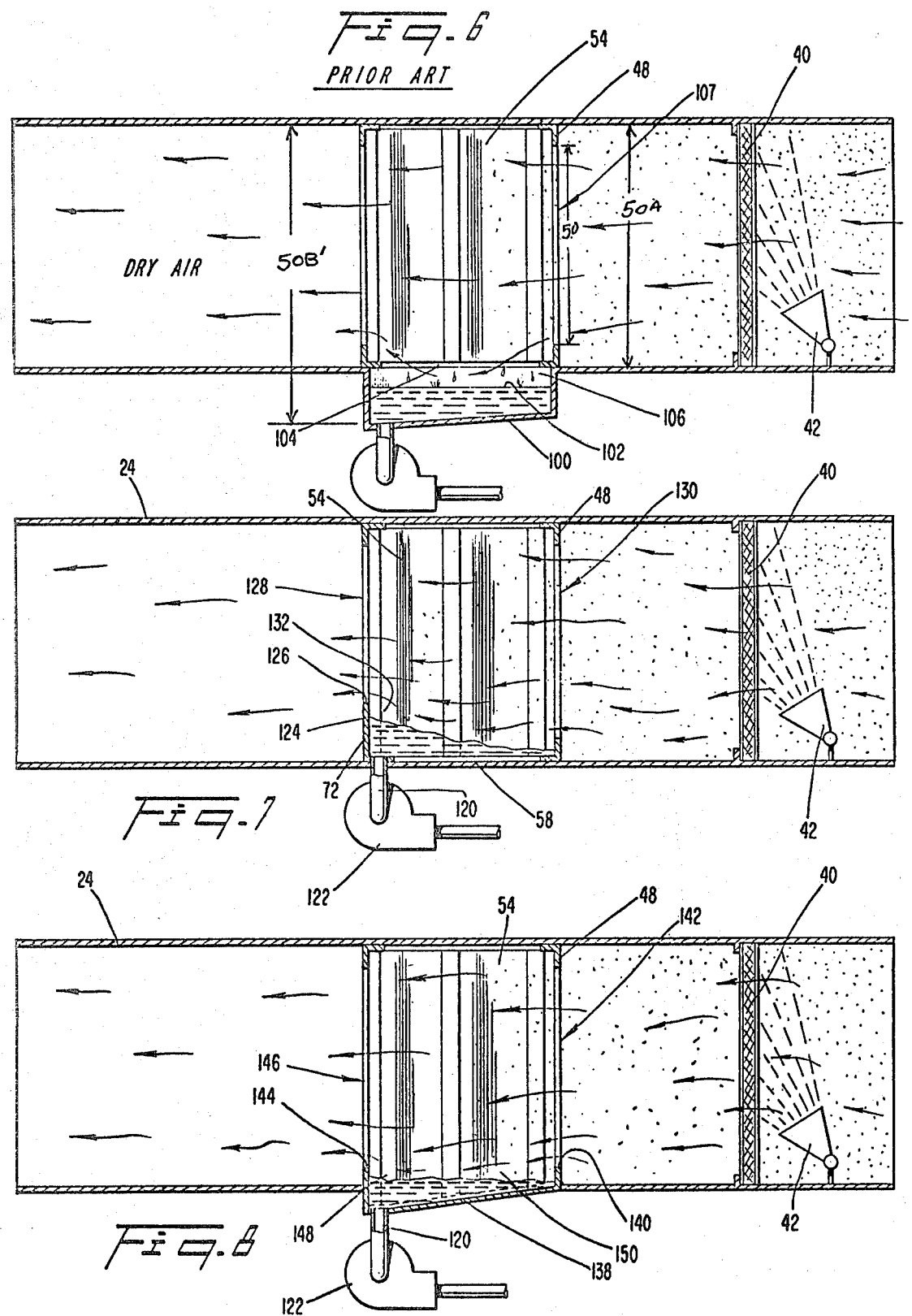

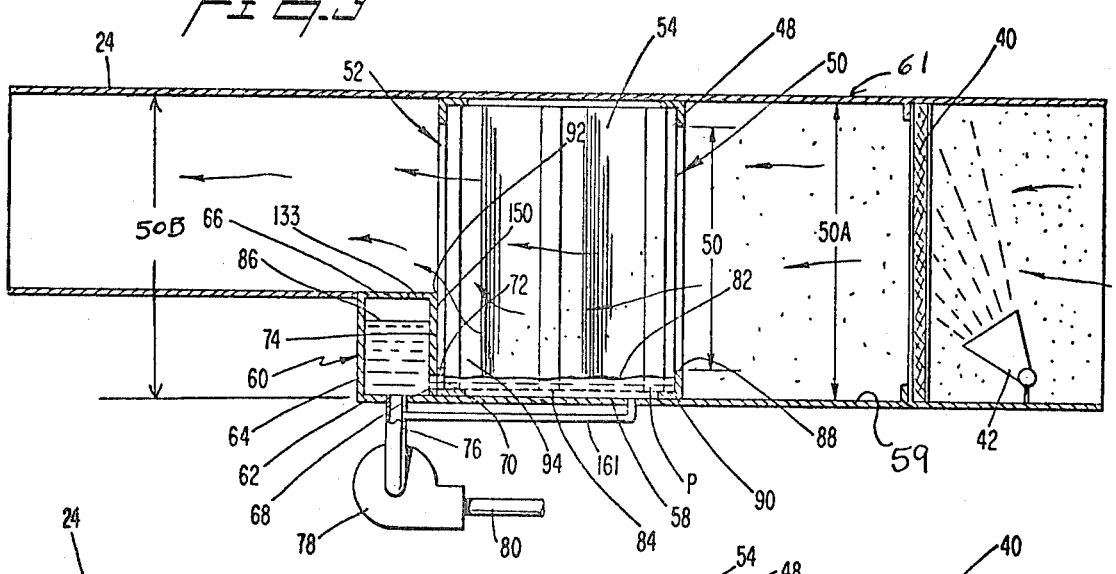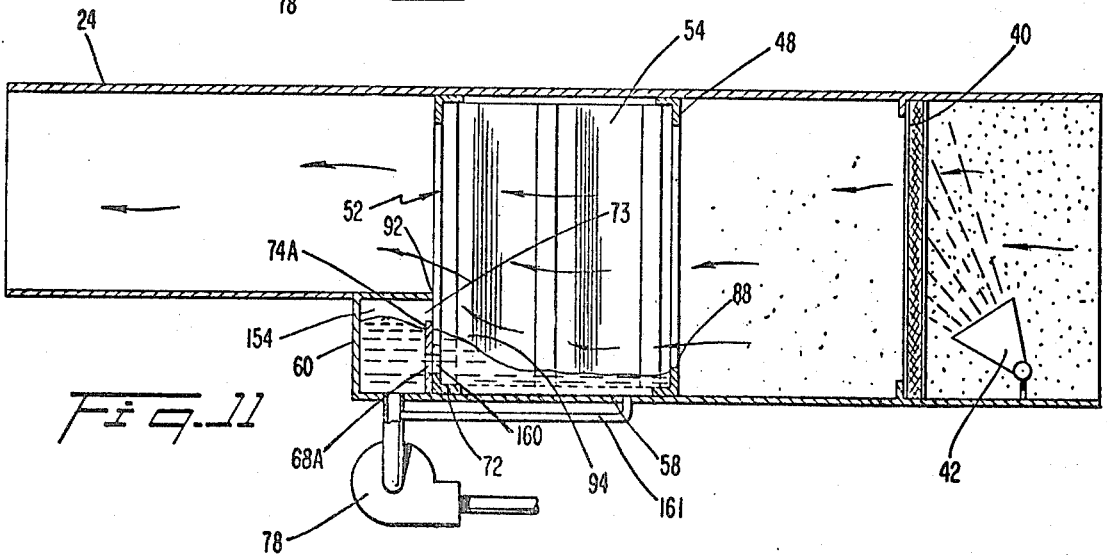

APPARATUS FOR REMOVING AND COLLECTING MOISTURE FROM A MOISTURE-LADEN AIR FLOW

BACKGROUND OF THE INVENTION

The present invention relates to the removal of moisture from air, especially for use in mine air-cleaning systems.

In many working environments substantial quantities of dust are present which, if not removed, are considered hazardous to personnel. In a mine environment, for example, in which operator-controlled continuous miner machines are utilized, it is important that large amounts of dust be removed from the air so that respirable dust levels do not exceed certain limits.

Air-cleaning systems have heretofore been utilized which employ a liquid spray (preferably water) to clean dust from the air. In such a system air is sucked-in through one or more inlet ducts toward the front of the miner by means of a fan. The fan is located downstream and receives air flow(s) from the inlet duct(s). Mounted preferably upstream of the fan area a "scrubber" and a "demister". Dust-laden air first passes through the scrubber while a high pressure water spray is introduced into the air flow to precipitate and wash-out some of the dust and other solids. The remaining solids become entrained within water droplets and continue-on within the air flow. Thereafter, such entrained dust and water-laden air flow passes through the demister which typically comprises an air inlet, an air outlet, a sump and a maze of "profiles" or louvers which cause "moisture" (i.e., pure water or water with contained solids) in the air to be separate-out and gravitate toward the sump located below the louvers. The clean, relatively dry air from the demister is then exhausted through the fan and usually thereafter through a widened exhaust duct.

Although air-cleaning systems of the above-identified type have performed satisfactorily in the past, certain shortcomings persist, especially regarding the size and performance of the demister apparatus. As regards size, the demister units currently available are generally of such height that they may be conveniently located on the miner only in certain areas where height is available. One such location is to the operator's left on the opposite side of the main discharge conveyor. With the demister in that location, however, the operator's vision to the left is impaired, thereby hampering efforts in making left-hand turns. In addition, such location of the demister has resulted in the fan motor being positioned so near to the operator that a substantial amount of noise therefrom can be discerned by the operator. Since the permissible duration of an operator's working shift may be influenced by the dosage of noise to which he is subjected, a more frequent replacement of operators may be necessary.

Concerning performance of the demister, a conventional demister is characterized by a maximum level of air inlet velocity which cannot be exceeded if acceptable performance is to be maintained. This, in effect, limits the rate of air flow which can be established through the demister, and thus limits the rate of demisting which can be attained. Other problems include the re-entrainment of moisture into the air flow due to the particular air flow patterns established in the demister.

It is, therefore, an object of the present invention to minimize or obviate shortcomings of the above-mentioned type.

It is another object of the invention to provide a novel demister apparatus and a novel demisting method.

It is a further object of the invention to enable the size, especially the height, of a demister to be reduced.

It is an additional object of the invention to enable the demister to be positioned further from the operator's station on a miner.

It is still another object of the invention to enable the efficiency of a demister to be increased.

It is still another object of the present invention to provide a novel air cleaning apparatus which can be retrofit to existing mining machines.

BRIEF SUMMARY OF THE PREFERRED EMBODIMENTS OF THE INVENTION

These objects are achieved by the present invention involving a mining machine of the type comprising a body, a driven cutter mounted on the body, and an air-cleaning system comprising duct work for conducting dust-laden air, a scrubber for applying liquid to the dust-laden air, and a demister for thereafter removing moisture from the air. The demister comprises a moisture separating station having a flow inlet, a flow outlet loaded rearwardly of the flow inlet, and moisture separating structure arranged for receiving air flow from the inlet and causing moisture in the air flow to separate-out and gravitate toward a lower collecting surface to be conducted rearwardly. The inlet and outlet each include a lower level. The distance from the collecting surface to the lower level of the inlet is less than the distance from the collecting surface to the lower level of the outlet to minimize the re-entrainment of the rearwardly conducted moisture into the outgoing air flow. A moisture discharge is located adjacent a rearward end of the collecting surface to remove the rearwardly conducted moisture.

Preferably, the discharge comprises a sump having an accumulating section located at a rearward end of the collecting surface, which includes a forwardly facing entrance.

Preferably, the moisture separating structure comprises a plurality of louvers whose lower ends extend substantially to the collecting surface to prevent the air flow from by-passing beneath the louvers.

THE DRAWING

These and other objects of the invention will become apparent from the following detailed description of preferred embodiments thereof in connection with the accompanying drawings in which like numerals designate like elements and wherein:

FIG. 1 is a plan view of a mining machine utilizing an air cleaning system in accordance with the present invention;

FIG. 2 is a side elevational view of the machine illustrated in FIG. 1;

FIG. 3 is a horizontal longitudinal sectional view depicting, in plan, a demister according to the present invention in relation to scrubber and suction fan components;

FIG. 4 is a vertical longitudinal sectional view taken along line 4—4 in FIG. 3;

FIG. 5 is an enlarged fragmentary plan view of louvers of a conventional demister;

FIG. 6 is a schematic showing of a demister unit according to the prior art;

FIG. 7 is a schematic showing of an alternate form of a demister according to the present invention;

FIG. 8 is a schematic showing of another form of demister according to the present invention;

FIG. 9 is a schematic showing of a form of demister depicted in FIG. 5;

FIG. 10 is a schematic showing of still another preferred form of demister; and

FIG. 11 is a schematic showing of yet a further preferred form of demister.

DETAILED DESCRIPTION OF A PREFERRED EMBODIMENT OF THE INVENTION

In FIGS. 1 and 2 a mining machine 10 is illustrated upon which a dust control system according to the present invention may be utilized. The mining machine 10 comprises a self-propelled body 12 carrying a conventional rotary cutter 14 at the front, and a discharge conveyor 16 extending rearwardly from the cutter 14. The body 12 is propelled by powered tracks 18 located at one side of the body. In operation, the rotary cutter 14 is advanced against the face of a subterranean deposit of ore to cut away ore fragments which are thereafter collected by an ore gathering mechanism 15 including the conveyor 16.

In accordance with the present invention, dust particles generated during such operations are removed from the air by a dust control system 22 depicted in FIGS. 3-8. Such a system comprises a pair of air inlet ducts 24, 25 having generally forwardly facing inlet openings 26 at opposite sides near the front of the body 12. The inlet ducts 24, 25 communicate with a common transfer duct 28 by means of a lateral connecting duct 27. Within each of the inlet ducts 24 there is disposed a fan 30 (FIGS. 3-4) which may be driven by an electric motor 32. The fans function to suck air into the inlet openings 26, draw the air through a scrubber apparatus 34 and a demister apparatus 36, and discharge the air from the common duct 28 through a discharge opening 38 whose cross-sectional area progressively increases in a downstream direction to minimize the velocity of the exiting air.

During passage of dust-laden air through the scrubber 34, some dust particles are removed from the air. Thereafter, moisture is removed from the air in the demister 36. The scrubber 34 comprises a screen 40 disposed across the opening 26, and a plurality of water spray nozzles 42. The nozzles 42 are oriented to spray a liquid, preferably water, onto the screen, as dust-laden air flows therethrough, to precipitate-out some of the dust particles and entrain the remaining dust and other solids within water droplets which continue-on within the air flow. Examples of conventional scrubbers are presented in U.S. Pat. No. 3,792,568 issued to Gundlach et al. on Feb. 19, 1974 and U.S. Pat. No. 4,076,315 issued to Gundlach et al. on Feb. 28, 1978.

Moist air is conducted from the screen 40 through a plurality of curved channels 44 formed by vanes 46 and enter the demister 36.

One preferred form of demister 36 is depicted in FIGS. 3, 4 and 9 and comprises a housing 48 defining an air inlet 50 and an air outlet 52 located rearwardly of the inlet 50. Between those openings 50, 52 are disposed a series of louvers or profiles 54 which are mounted in the housing and are of convolute or sinusoidal configuration to form a plurality of wavy air conducting passages 56. Air is able to travel around the bends in the passages, whereas the moisture (i.e., pure water or water with contained solids) contacts the bends and thereupon separates from the air flow and gravitates toward a sump and onto a collecting surface 58 located beneath the louvers 54. The placement of fingers 59 along the louvers 54 forms vertical pockets which facilitate the separation of the moisture and minimize rearward travel of moisture along the louvers (i.e., from right to left in FIG. 4).

The collecting surface 58 may be positioned slightly below the lower ends of the louvers 54 as shown, or may be in contact with such lower ends.

After gravitating onto the collecting surface 58 the moisture is conducted rearwardly (i.e., right to left in FIG. 4) under the influence of the air flow. That is, the air flow drives the moisture rearwardly.

At the rearward end of the collecting surface there is disposed an accumulating portion 60 of the sump which comprises a floor 62, an end wall 64, and a top wall 66. The floor 62 is preferably substantially coplanar with the collecting surface 68. The accumulating portion of the sump 60 includes a generally forwardly facing entrance 68 which communicates with moisture at the rearward end of the collecting surface. A rear bar 72 of the housing 48 of the demister may be provided with an opening 70 facing the entrance 68, or such opening 70 may be omitted whereby moisture merely flows over the edge of the rear bar 72 of the housing 48 and passes through the entrance 68.

The accumulating portion 60 of the sump may include a front wall 74 located above the entrance 68. It will be appreciated that in the preferred embodiment of the invention the accumulating portion 60 is located completely rearwardly of the louvers 54.

The accumulating portion 60 of the sump extends upwardly to a level above the lower ends of the louvers so that moisture may accumulate in the portion 60 to a level above the lower ends of the louvers, although accumulation to such a level need not necessarily occur.

A discharge opening 76 is located in the floor 62 of the accumulating portion 60 to discharge moisture which accumulates therein. Preferably, the moisture gravitates through the opening 76 although a pump 78 can be provided in a discharge line 80 to suck moisture from the accumulating portion if needed.

The air inlet 50 includes a lower level 88 defined by the edge of a rear bar 90 of the housing 48. The outlet 52 includes a lower level 92 defined by the upper portion of the accumulating portion 60. The lower level 88 of the inlet is disposed below the lower level 92 of the outlet. It will be appreciated that the distance from the collecting surface 58 to the lower level 92 is greater than the distance from the collecting surface to the lower level 88. Thus, the collecting surface 58 and the lower portion of the air flow (which is constrained to travel upwardly from the inlet to the outlet) diverge in the rearward direction. Also, the lower portion of the air flow and the level 84 of the lower ends of the louvers diverge in the rearward direction. That is, the distance from the lower end of each louver to the lower level 88 of the inlet is less than the distance from the lower end of each louver to the lower level 92 of the outlet.

The advantages of the present invention over a previously utilized demister can be best explained by a consideration of FIG. 6 which schematically illustrates a conventional demister unit. The conventional demister unit includes a high capacity sump 100 located beneath the louvers 54. During operation, moisture gravitates along the louvers and drops into the sump 100. The air flow travels rearwardly parallel to the moisture level 102 in the sump and, as a result, the air flow may tend to dip below the lower level 104 of the louvers into space 106, wherein there exists little resistance to air travel, and contact the moisture, thereby producing a considerable amount of re-entrainment of moisture into the air flow.

That is, the air flow dips below the louvers in order to stabilize the system at an over-all minimum air resistance. This may be compensated-for by employing a larger inlet 107 or a decreased quantity of air flow through the system in order to assure that the air inlet velocity does not exceed a predetermined maximum value, as discussed herein earlier in the background section. The first solution would further enlarge the height of the demister which is already relatively high due to the presence of the sump beneath the louvers, whereas the second solution would reduce the efficiency of the system.

The present invention alleviates problems of those types by minimizing the tendency of the air flow to seek a travel path beneath the louvers. By raising the floor (i.e., collecting surface) of the sump relative to the bottom ends of the louvers, the louvers extend into the sump and a greater resistance to air travel is created in the area of collected moisture. The lower portion of the air flow is, in effect, raised and no longer seeks to travel beneath the louvers. Rather, the air flow stabilizes at an over-all minimum air resistance without dipping beneath the louvers. It will be appreciated, then, that such minimum air resistance is greater than that of the FIG. 6 structure. As a result, for a given over-all system height 50B, extending from the bottom of the collecting surface to the top of the duct, the inlet height 50 and the inlet duct height 50A can be enlarged (note the higher over-all system height 50B' in FIG. 6). This makes possible an increase in the amount of air flow through the unit (and thereby an increase in performance) without exceeding the critical maximum air speed at the inlet 50; or the duct height 50A per given quantity of air flow can be reduced without exceeding such critical maximum air speed.

Moreover, since the tendency for the air flow to dip beneath the louvers is essentially eliminated, there occurs no appreciable contact between the air flow and the separated moisture. Accordingly, re-entrainment of moisture into the air flow is minimized.

In the preferred embodiment of of the invention the lower ends of the louvers 54 extend downwardly to the collecting surface 58. Since such lower ends are supported on thin horizontal flanges of lower bars 48, there will exist a slight gap between the louvers and the collecting surface 58 which has no effect on the raising of the lower portion of the air flow. The lower ends of the louvers will normally extend the expected level of particulate on the collecting surface. In order to minimize the height of the system, it is preferred that the collecting surface be substantially co-planar with the bottom surface 59 of the in-feed duct 61 (FIG. 9).

It will be appreciated that by enlarging the inlet 50, and with the louvers extending across the entire enlarged inlet, (i.e., the louvers are arranged to act upon all of air flow entering the inlet), the amount of demisting contact between the louvers and air flow is increased.

By providing the sump with an accumulating portion 60 located at a rearward end of the louvers and extending above the lower ends of the louvers the overall height of the unit can be significantly reduced, rendering the demister unit more versatile as regards possible locations of placement. In this regard, demisters can now be located in the inlet ducts 24, 25. Accordingly, the scrubber and fan components can also be moved forwardly. By thus locating the scrubber, demister and fan assemblies forwardly as depicted, rather than in region 110 (FIG. 1) as was previously the case, there is no appreciable obstruction of the operator's view to the left due to the air cleaning system.

It will be appreciated that, if desired, the scrubber, demister, and fan assemblies may be located at region 110 within the scope of the present invention since the invention produces advantages other than height reduction, such as increased air flow per given inlet size as previously explained. Thus, at the region 110 there may be positioned a scrubber, a demister according to the present invention located downstream of the scrubber, and a fan located downstream of the demister.

It should also be noted that the rearwardly diverging relationship between the lower portion of the air flow and the collecting surface 58, creates an enlarged dead air space 94 located below the air outlet 52. This dead air space 94 occurs in a region where separated moisture may be collected, and thereby minimizes re-entrainment of moisture in the outgoing air flow. In addition, the dead air space 94 constitutes a region of somewhat higher static pressure (relative to that found at the outlet 52) which is communicated to a region 154 in the accumulating portion 60 above the level of moisture in the portion 60. That is, the static pressure above the moisture will be somewhat higher than the static pressure at the air outlet 52. Such increased static pressure in the region 154 aids in emptying moisture through the discharge 76. If desired, one or more slits 133 (FIG. 9) can be provided in the top wall 66 of the accumulating portion 60 to communicate the front of the region 154 with the air outlet 52. As a result, the resistance to entry of moisture through the entrance 72 will be reduced.

It should also be noted that in addition to, or in lieu of, the suction pump 78 for evacuating the sump 60, it may be desirable to employ a downwardly directed fluid spray(s) of air or water, located at the top of the sump and above the outlet(s) 76 to "push" the moisture through the outlet(s).

In accordance with the present invention, it may be possible to eliminate the need for an accumulating portion located rearwardly of the louvers by providing an outlet 120 through a rear end of the collecting surface 58 (and perhaps utilizing a high-capacity suction pump 122 for removing the moisture (FIG. 7)). To constrain the moisture which accumulates at the rear end of the collecting surface, a wall 124 can be provided, preferably formed by an extended portion of the rear bar 72 so as to form an accumulating portion above the outlet 120. The vertical distance between the collecting surface 58 and the top 126 of the wall 124 (i.e., the lower level of the outlet 128) is greater than the distance between the collecting surface 58 and the lower level of the inlet 130. Thus, the lower portion of the air flow travels upwardly from the inlet to the outlet (i.e., it diverges from the collecting surface 58 and the level of the lower ends of the louvers) forming a relatively dead air zone 132. Accordingly, the moisture can build-up within the accumulating portion to a level well above the discharge outlet 120 without greatly increasing the rate of moisture re-entrainment.

In another embodiment of the invention, illustrated in FIG. 8, there is provided an alternate manner of achieving divergence between the rearward directions of travel of the separated moisture and the air flow, namely, by inclining the collecting surface 138 rearwardly and downwardly toward the outlet 120 to form an accumulating portion at the rear end of the collecting surface above the outlet 120. The lower levels 140, 144 of the inlet and outlet are substantially the same. Accordingly, the distance between the collecting surface 138 and the lower level 140 of the inlet 142 is less than the distance between the collecting surface 138 and the lower level 144 of the outlet 146. As a result, the separated moisture travels rearwardly and downwardly, whereas the bottom portion of the air flow travels substantially horizontally. Hence a relatively dead air zone 148 is established within which the separated moisture may accumulate.

The louvers 150 may be shaped so that the level of their lower ends is essentially parallel with the collecting surface, to prevent the air flow from by-passing the louvers. This means that the rearward end of each louver extends further downwardly than the forward end, due to the inclined nature of the collecting surface 138. Hence, the direction of travel of the lower portion of the air flow diverges relative to the lower end of each louver. Hence, the air flow will not by-pass the air channels 56.

The invention described thus far is similar to that invented earlier by Robert C. McGuire and disclosed in his U.S. Patent application Ser. No. 950,548.

In an embodiment of the invention illustrated in FIG. 10, the wall 74 has been removed to form a gap 73 beneath the level 92. This eliminates the continuous path extending completely up to the lower level 92 of the outlet 52 which otherwise would enable moisture droplets to travel upwardly and reach such lower level to be re-entrained in the air flow. It is also possible that a similar effect could be achieved by removing only a portion of the wall 74, rather than the entire wall, to define one or more vertical gaps 73 along all or a part of the horizontal width of the wall 74A, as illustrated in FIG. 11. Such an arrangement (FIG. 11) enables the advantage of a front wall to be maintained (retainment of water within sump) while facilitating the access of water into the accumulating portion 60. Of course, openings 160 could be provided through the wall 74A and the rear bar of the demister housing.

In operation of the FIG. 10 embodiment, the moisture P is urged rearwardly into the accumulating portion 60 through the unobstructed entrance 68A (FIG. 10). If desired, an opening can be formed in the rear bar 72 of the louver housing 48 similar to the opening 70 of the FIG. 9 embodiment.

In a manner similar to that described in connection with the embodiment of FIG. 9, the lower portion of the air flow travels upwardly from the lower level 88 of the inlet to the lower level 92 of the outlet. Thus, a relatively dead air zone 94 is established in front of the accumulating portion 60 which minimizes moisture re-entrainment and creates a higher static pressure in the sump portion 154 than at the air outlet 52. This aids considerably in emptying moisture from the sump. There would not be provided in this embodiment a slit similar to 133 in FIG. 9 since it is not necessary that portion 154 communicate with static pressure at the outlet 52.

Importantly, it has been found that an additional drain 161 extending through a forward end of the collecting surface 58 (FIGS. 9-11) aids in the removal of some of the "moisture" from the demister, especially when the system is inclined (dipped) down at the front relative to the back (i.e., when such a system is mounted on a continuous miner as described above, and such miner is mining down-grade).

It is significant to note that the present invention can be incorporated in existing mining machines as a retrofit unit. For example, the entire air flow ducting of a miner can be replaced by the ducts 24, 25, 27, 29 and common duct 28 of the present invention wherein scrubber 34, demister 36 and fan 30 units are provided in each inlet duct 24, 25. Alternatively, a demister unit according to the present invention can be disposed in an existing common duct 28.

It should also be noted that the lateral connecting duct 27 can be eliminated and the housings and the fans 30 oriented so that the fans discharge the air flow toward the gathering mechanism 15.

It will be appreciated that the novel demister described herein improves the performance of a demister unit and/or enables the size thereof to be reduced. By eliminating the presence of a sizeable sump beneath the louvers, the overall height of the demister can be reduced and/or the air flow can be increased. By providing divergent travel directions for the separated moisture and air flows, the chances for re-entrainment of moisture are reduced. The vertical gap above the moisture flowing into the accumulating section inhibits travel of moisture droplets upwardly over the top wall of the accumulating section, which otherwise would result in increased re-entrainment of moisture in the air.

The principles, preferred embodiments and modes of operation of the present invention have been described in the foregoing specification. The invention which is intended to be protected herein, however is not to be construed as limited to the particular forms disclosed, since these are to be regarded as illustrative rather than restrictive. Variations and changes may be made by those skilled in the art without departing from the spirit of the invention.

What is claimed is:

1. In a mining machine of the type comprising a body, a driven cutter mounted on said body, and an air-cleaning system comprising duct means for conducting dust-laden air, scrubber means for applying liquid to said dust-laden air, and demisting means for thereafter removing moisture from the air, the improvement wherein said demisting means comprises:

means defining a moisture separating station having a flow inlet, a flow outlet located rearwardly of said flow inlet, and moisture separating means defining air channels for receiving air flow from said inlet and causing moisture in the air flow to separate-out and gravitate toward a lower collecting surface to be conducted rearwardly; and a moisture accumulating section located adjacent a rearward end of said collecting surface and including a top wall disposed at a level above a lower level of said flow inlet, a generally forwardly facing entrance disposed at a rearward end of said moisture separating means for admitting said rearwardly conducted moisture to receive the latter, and a vertical gap below said top wall and above the inflowing moisture to substantially prevent moisture droplets from traveling upwardly over the top wall.

2. Apparatus according to claim 1, wherein a front end of said accumulating section facing said collecting surface is substantially open from said collecting surface to said top wall.

3. Apparatus according to claim 1, wherein said accumulating section includes a front wall having said forwardly facing entrance at the bottom thereof for receiving moisture and a forward facing opening defining said gap.

4. Apparatus according to claim 1, wherein said accumulating section is located completely rearwardly of said flow outlet.

5. Apparatus for separating moisture from air comprising:
  means for conducting a flow of moisture-laden air;
  means defining a moisture separating station having a flow inlet, a flow outlet located rearwardly of said flow inlet, and moisture separating means defining air channels for receiving air flow from said inlet and causing moisture in the air flow to separate-out and gravitate toward a lower collecting surface to be conducted rearwardly;
  a moisture accumulating section located adjacent a rearward end of said collecting surface to remove said rearwardly conducted moisture, said accumulating section including a top wall disposed at a level above a lower level of said inlet, a generally forwardly facing entrance disposed at a rear end of said moisture separating section for admitting said rearwardly conducted moisture, the portion of said entrance immediately below said top wall and above the inflowing moisture being substantially open to substantially prevent moisture droplets from traveling upwardly over said top wall.

6. Apparatus according to claim 5, wherein a front end of said accumulating section facing said collecting surface is substantially open from said collecting surface to said top wall.

7. Apparatus according to claim 5, wherein said accumulating section includes a front wall having said forwardly facing entrance at the bottom thereof for receiving moisture and a forward facing opening.

8. A mining machine comprising:
  a self-propelled body,
  a driven cutter on a forward end of said body,
  air-cleaning means comprising:
    a pair of inlet ducts located on opposite sides of said body and including inlet openings,
    a common discharge duct communicating with said forward ducts for receiving air from the latter and conducting it rearwardly,
  means creating a suction at said inlet openings for sucking-in dust-laden air from areas adjacent the forward end of said body,
  a sprayer means in each inlet duct for spraying water onto the sucked-in air, and
  demisting means in each inlet duct downstream of said sprayer means for separating moisture from the air, said demisting means comprising:
    a flow inlet having a lower level,
    a plurality of louvers for receiving air flow from said inlet and causing moisture in the flow to separate-out and gravitate toward a lower collecting surface to be conducted rearwardly under the influences of the air flow,
    an outlet for conducting air from said demisting means, said outlet including a lower level disposed above said lower level of said inlet such that the lower portion of said air flow travels upwardly from said inlet to said outlet,
    a moisture accumulating section disposed completely rearwardly of said louvers and including a floor generally coplanar with said collecting surface, an end wall, and a top wall disposed at a level above said lower level of said inlet, the front portion of said accumulating section defining an entrance for moisture, at least a portion of said entrance immediately below said top wall being substantially open to substantially prevent the travel of moisture droplets upwardly and over said top wall.

* * * * *